United States Patent
Benjamin et al.

(10) Patent No.: US 8,622,625 B2
(45) Date of Patent: Jan. 7, 2014

(54) FIBER END FACE VOID CLOSING METHOD, A CONNECTORIZED OPTICAL FIBER ASSEMBLY, AND METHOD OF FORMING SAME

(75) Inventors: Seldon David Benjamin, Painted Post, NY (US); Robert Stephen Wagner, Corning, NY (US); Percil Watkins, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 437 days.

(21) Appl. No.: 12/788,867

(22) Filed: May 27, 2010

(65) Prior Publication Data
US 2010/0303419 A1 Dec. 2, 2010

Related U.S. Application Data

(60) Provisional application No. 61/182,163, filed on May 29, 2009.

(51) Int. Cl.
G02B 6/36 (2006.01)
G02B 6/255 (2006.01)

(52) U.S. Cl.
USPC .............................. 385/72; 385/96

(58) Field of Classification Search
None
See application file for complete search history.

(56) References Cited

U.S. PATENT DOCUMENTS

| | | | |
|---|---|---|---|
| 6,112,967 A | 9/2000 | Ostendarp et al. | 225/93.5 |
| 6,204,472 B1 | 3/2001 | Muzzi et al. | 219/121.67 |
| 6,327,875 B1 | 12/2001 | Allaire et al. | 65/103 |
| 6,407,360 B1 | 6/2002 | Choo et al. | 219/121.67 |
| 6,420,678 B1 | 7/2002 | Hoekstra | 219/121.75 |
| 6,521,862 B1 | 2/2003 | Brannon | 219/121.66 |
| 6,541,730 B2 | 4/2003 | Nam et al. | 219/121.67 |
| 6,713,720 B2 | 3/2004 | Jeon et al. | 219/121.72 |
| 7,376,315 B2 * | 5/2008 | Kurosawa et al. | 385/123 |
| 7,433,566 B2 | 10/2008 | Bookbinder et al. | |
| 7,450,806 B2 | 11/2008 | Bookbinder et al. | |
| 7,450,807 B2 | 11/2008 | Bickham et al. | |
| 7,458,734 B2 * | 12/2008 | Bookbinder et al. | 385/96 |
| 7,505,606 B2 | 3/2009 | Lin et al. | |
| 7,742,670 B2 * | 6/2010 | Benjamin et al. | 385/125 |

(Continued)

FOREIGN PATENT DOCUMENTS

| JP | 2005-24842 | 1/2005 |
|---|---|---|
| JP | 2005-175271 | 8/2009 |

(Continued)

OTHER PUBLICATIONS

Parton, J.R., "Improvements to the Variable Aperture Method for Measuring the Mode-Field Diameter of a Dispersion-Shifted Fiber", Journal of Lightwave Technology, vol. 7, No. 8, Aug. 1989, pp. 1158-1161.

*Primary Examiner* — Kaveh Kianni
(74) *Attorney, Agent, or Firm* — Svetlana Short

(57) ABSTRACT

A method for closing the holes on the end face of a nano-engineered fiber having a core, a cladding with non-periodically disposed voids, and at least one of a coating and a buffer, comprises the steps of:
(i) cleaving the fiber portion, thereby forming a cleaved end face; and
(ii) applying a predetermined amount of energy via a laser beam to the cleaved end face, the amount of energy being sufficient to collapse and seal the voids exposed at the cleaved end face only to a depth of less than 11 μm.

10 Claims, 9 Drawing Sheets

(56) References Cited

U.S. PATENT DOCUMENTS

| | | |
|---|---|---|
| 2006/0137403 A1 | 6/2006 | Barr et al. .................... 65/377 |
| 2006/0204195 A1* | 9/2006 | Kurosawa et al. ............ 385/125 |
| 2008/0110209 A1* | 5/2008 | Bookbinder et al. ........... 65/378 |
| 2008/0145011 A1 | 6/2008 | Register ....................... 385/128 |
| 2008/0166094 A1 | 7/2008 | Bookbinder et al. .......... 385/124 |
| 2008/0250816 A1* | 10/2008 | Kurosawa et al. .............. 65/385 |
| 2008/0253726 A1* | 10/2008 | Kurosawa et al. ............ 385/123 |
| 2008/0267568 A1* | 10/2008 | Dean ............................... 385/96 |
| 2008/0273839 A1* | 11/2008 | Beshears et al. ................ 385/72 |
| 2008/0304796 A1* | 12/2008 | Beshears et al. ................ 385/85 |
| 2010/0119202 A1* | 5/2010 | Overton ......................... 385/141 |
| 2010/0239217 A1* | 9/2010 | Miyabe et al. ................. 385/123 |
| 2010/0272406 A1 | 10/2010 | Bookbinder et al. |

FOREIGN PATENT DOCUMENTS

| | | |
|---|---|---|
| JP | 2009-175271 | 8/2009 |
| WO | 03/032018 | 4/2003 |
| WO | 03/032039 | 4/2003 |
| WO | 2008/137032 | 11/2008 |

\* cited by examiner

FIBER END FACE VOID CLOSING METHOD, A CONNECTORIZED OPTICAL FIBER ASSEMBLY, AND METHOD OF FORMING SAME

This application claims the benefit of U.S. Provisional Application Ser. No. 61/182,163, filed May 29, 2009, entitled "Fiber End Face Void Closing Method, A Connectorized Optical Fiber Assembly, and Method of Forming Same."

BACKGROUND OF THE INVENTION

1. Field of the Invention

The present invention relates generally to connectorized optical fibers, and more specifically, to methods for collapsing voids in the cladding of nano-engineered optical fibers, and to a method of manufacturing optical connectors that include such fiber(s).

2. Technical Background

Optical fibers containing voids or holes are being designed and produced for a number of applications. However, optical fiber containing voids or holes may present problems in connectorization of this type of fiber. For example, material ingress into the holes or egress out of the holes can change the properties of the optical fiber in an undesirable manner if they are large enough, and could also interfere with connector function. In addition, in fibers with a high density of holes the mechanical cleaving process is disrupted and hackle may result. Also, when such fiber is used in optical connectors, difficulties may arise in connecting or splicing such optical fiber to conventional optical fiber. For example, core alignment of the optical fibers to be joined is hindered by the presence of the holes in the vicinity of the end to be spliced.

Optical fiber connectors enable rapid connection and disconnection of optical fibers as compared to fusion splicing. Connectors serve to align the cores of mating optical fibers so that light can pass between them with minimal loss (attenuation), and provide mechanical coupling to hold the mating fibers together. In the early days of fiber optic systems, the use of connectors was problematic because poor connections introduced attenuation, and the connectorization process was time-consuming and required highly trained technicians. However, manufacturers have since standardized and simplified optical fiber connectors, thereby contributing to their increased use in fiber optic systems. The increased use of connectors has greatly contributed to new uses and applications for fiber optic systems, including new and creative deployments in building infrastructures.

Attendant with the increased use of fiber optic systems are issues relating to deploying optical fiber cables wherein the cables need to be bent to accommodate the geometry of a pre-existing structure or infrastructure. Improper handling and deployment of a fiber optic cable can result in macrobending losses, also known as "extrinsic losses." In ray-optics terms, severe bending of an optical fiber can cause the angles at which the light rays reflect within the fiber to exceed the critical angle of reflection. Stated in electromagnetic-wave terms, the bending causes one or more of the guided modes of the optical fiber to become leaky modes wherein light escapes or "leaks" from the guiding region of the fiber. Such bending losses can be prevented by observing the minimum bend radius of the particular optical fibers and optical fiber cables that carry the optical fibers.

Because deploying fiber optic cables typically involves bending one or more of the cables at some location, advanced optical fibers have been developed that have improved bend performance properties. Enhanced bend performance allows for fiber optic cables to be deployed in a greater number of locations than might otherwise be accessible due to the bending limits of a conventional fiber optic cable. One type of bend-performance optical fiber is a "nano-engineered" fiber that utilizes small holes or voids ("airlines") formed in the optical fiber. Nano-engineered fibers operate using basically the same wave-guiding principles as ordinary optical fibers wherein the light is guided in the core by the index difference between the core and cladding, with the exception that the nano-engineered region enhances the fibers' light-carrying ability even when severely bent. However, while nano-engineered bend-performance fibers offer a significant increase in the minimum bend radius, there are some shortcomings when it comes to connectorizing such fibers because of the voids or airlines present at the end of a cleaved fiber. For example, contaminants can fill the fiber voids (i.e., airlines) at the fiber end face and ingress into the fiber, thereby reducing the efficiency of the connection. One such contaminant is water. Other contaminants include micro-debris generated at the connector end face during the connector polishing processes, such as mixtures of zirconium ferrule material and silica glass removed during polishing, abrasives from polishing films, and deionized water. These contaminants may become trapped or embedded in the airlines at the connector end face. Due to the various forces and attendant heat that the connector end experiences during the polishing process, it is extremely difficult to remove the contaminants once they are in place. In addition, contamination in the fiber that is freed during operation and/or handling of the fiber and that moves across the connector end face into the fiber core region may also increase signal attenuation.

SUMMARY OF THE INVENTION

According to one embodiment of the present invention, a method for closing the holes on the end face of a nano-engineered fiber having a core, a cladding with non-periodically disposed voids, and at least one of a coating and a buffer, comprises the steps of:

(i) cleaving the fiber portion, thereby forming a cleaved end face; and (ii) applying a predetermined amount of energy via a laser beam to the cleaved end face, the amount of energy being sufficient to collapse and seal the voids exposed at the cleaved end face only to a depth of less than 11 μm. According to at least one embodiment, the exemplary fiber end has no voids within a length of not larger than 11 μm.

According to another embodiment, a method of connectorizing an optical fiber comprising, in order, the steps of:

providing a nano-engineered fiber having a core, a cladding with non-periodically disposed voids, and at least one of a coating and a buffer;

stripping a length of at least one of the coating and the buffer to expose an end portion of the optical fiber;

mounting the optical fiber within a connector ferrule having a ferrule end face so that the exposed portion of the fiber protrudes beyond the ferrule end face; and cleaving the exposed optical fiber portion that protrudes beyond the ferrule end face, forming a cleaved end face;

applying a predetermined amount of energy to cleaved end face sufficient to collapse and seal the voids exposed at the cleaved end face, to provide a fiber end face having no voids.

According to another embodiment, a method of connectorizing an optical fiber comprising, in order, the steps of:

providing a nano-engineered fiber having a core, a cladding with non-periodically disposed voids, and at least one of a coating and a buffer;

stripping a length of the at least one of the coating and the buffer to expose an end portion of the optical fiber;

mounting the optical fiber within a connector ferrule having a ferrule end face so that the exposed portion of the fiber protrudes beyond the ferrule end face; and cleaving the exposed optical fiber portion that protrudes beyond the ferrule end face, forming a cleaved end face;

mechanically polishing fiber and ferrule end face;

selectively applying a predetermined amount of energy to cleaved and polished end-face sufficient to collapse and seal the voids exposed at the cleaved end face, to provide a fiber end face having no voids.

According to yet another embodiment, a connectorized nano-engineered optical fiber assembly comprises:

a connector ferrule having at least one bore and an end face;

at least one nano-engineered fiber having a bare fiber section arranged in the at least one bore, said optical fiber having a core, a cladding with non-periodically disposed voids formed therein, and a bare fiber end face formed by cleaving that is substantially to be co-planar with the ferrule end face; and wherein the bare fiber section includes an void-free portion that includes the bare fiber section end face that has (i) an void-free bare-fiber diameter substantially the same as the void-inclusive bare-fiber diameter and (ii) an indentation in the bare fiber section end face, said indentation being less than 0.5 μm deep.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
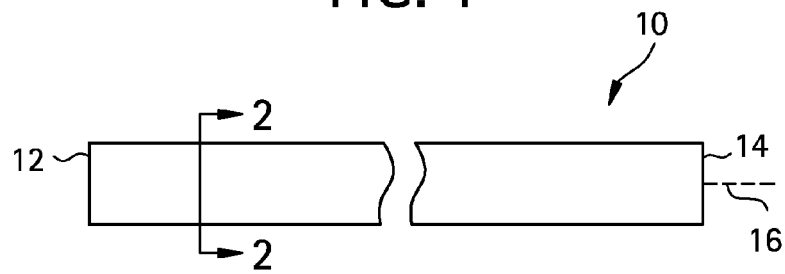
FIG. 1 is a side view of a section of nano-engineered fiber.

Reference is now made to preferred embodiments of the invention, examples of which are illustrated in the accompanying drawings. Whenever possible, the same reference numbers and symbols are used throughout the drawings to refer to the same or like parts.

DEFINITIONS AND TERMINOLOGY

In the description below, the "refractive index profile" is the relationship between refractive index or relative refractive index and waveguide fiber radius. The "relative refractive index percent" is defined as $\Delta_i(\%)=[(n_i^2-r_c^2)/2n_i^2]\times 100$, where $n_i$ is the maximum refractive index in region i, unless otherwise specified, and $n_c$ is the average refractive index of a cladding region, as discussed below. In some example embodiments, $n_c$ is taken as the refractive index of an inner annular cladding region 32, as discussed below.

As used herein, the relative refractive index percent is represented by $\Delta(\%)$ or just "$\Delta$" for short, and its values are given in units of "%", unless otherwise specified or as is apparent by the context of the discussion.

In cases where the refractive index of a region is less than the average refractive index of the cladding region, the relative refractive index percent is negative and is referred to as having a "depressed region" or a "depressed index," and is calculated at the point at which the relative refractive index is most negative unless otherwise specified. In cases where the refractive index of a region is greater than the average refractive index of the cladding region, the relative refractive index percent is positive and the region can be said to be raised or to have a positive index.

An "updopant" is herein considered to be a dopant, which has a propensity to raise the refractive index relative to pure undoped $SiO_2$. A "downdopant" is herein considered to be a dopant, which has a propensity to lower the refractive index relative to pure undoped $SiO_2$. An updopant may be present in a region of an optical fiber having a negative relative refractive index when accompanied by one or more other dopants that are not updopants. Likewise, one or more other dopants that are not updopants may be present in a region of an optical fiber having a positive relative refractive index. A downdopant may be present in a region of an optical fiber having a positive relative refractive index when accompanied by one or more other dopants that are not downdopants. Likewise, one or more other dopants that are not downdopants may be present in a region of an optical fiber having a negative relative refractive index.

Other techniques to form depressed index regions besides the use of downdopants, such as through the use of microstructures, are used in example embodiments of the present invention and are described in greater detail below. Microstructures include, for example, non-periodic and periodic discrete microvoids occurring along the length of the fiber such as airlines having a diameter in fiber cross-section of greater than 5 nm (nanometer) and less than 1550 nm (for example airlines greater than 5 nm with an average diameter of approximately 250 nm).

The terms voids, holes and airlines can be used interchangeably and mean a portion of the optical fiber which contains empty space or a gas.

The mode field diameter (MFD) is a measure of the spot size or beam width of light across the end face of an optical fiber. MFD is a function of source wavelength and the fiber geometry, i.e., fiber core radius and fiber refractive index profile. The vast majority of the optical power propagating in an optical fiber travels within the fiber core, with a small amount of power propagating in the cladding as an evanescent field. Mismatches in the mode field diameter can affect splice and connector loss. The MFD is measured using the Peterman II method wherein, $2w=MFD$, and $w^2=(2\int f^2 \, rdr/\int [df/dr]^2 \, rdr)$, the integral limits being 0 to $\infty$. A method of experimentally measuring the MFD is the variable aperture method in the far field (VAMFF), which is described in the article by Parton, J. R., "Improvements in the Variable Aperture Method for Measuring the Mode-Field Diameter of a Dispersion-Shifted Fiber," *Journal of Lightwave Technology*, Vol. 7, No. 8, August 1989 (pp. 1158-1161), which article is incorporated by reference herein. The MFD is measured in irradiance, which is optical power per unit area ($W/cm^2$).

For a Gaussian power distribution in a single-mode optical fiber, the MFD is measured between points at which the electric and magnetic field strengths are reduced to $1/e$ of their maximum values, i.e., it is the diameter at which the optical power is reduced to $1/e^2$ of the maximum power, wherein power is proportional to the square of the field strength. As used herein, MFD assumes a given wavelength (e.g., 1550 nm) unless otherwise noted.

A related concept to MFD is the "effective area" of an optical fiber, which is defined as: $A_{eff}=2\pi(\int f^2 \, r \, dr)^2/(\int f^4 \, r \, dr)$, where r is the radial coordinate, the integration limits are 0 to $\infty$, and f is the transverse component of the electric field associated with light propagated in the optical fiber.

In multi-mode fibers (either the step-index or the graded-index variety), the core diameter is typically used to measure the distribution of the light beam exiting the fiber. The core size is measured optically, and in a preferred approach is defined as the diameter corresponding to a specific threshold percentage of power in the core. A standard core diameter measurement approach is set out by the International Electrotechnical Commission (IEC) Standard IEC 60793-1-2 (2001). For reference, see the IEC 60793-1-2 document under "Measurement methods and test procedures—Fibre geometry," Section C.4.2.2 Option 2, which document section is incorporated by reference herein by way of background information. The IEC standard is used herein as the definition of core diameter for multi-mode nano-engineered fibers 10.

Note that MFD and the core diameter are related concepts that describe the distribution of light exiting the fiber based on a threshold amount of power. In the present invention, these parameters change by substantially the same amounts. Accordingly, the description herein and the claims below use the term "mode field diameter" or MFD in the general sense to describe the light distribution associated with either a single-mode or a multi-mode fiber, where the MFD for a single-mode fiber is defined as above, and wherein the MFD of a multi-mode fiber is defined as the core diameter according to the aforementioned IEC standard.

In general, the MFD increases after heating the fibers, though in some instances the MFD can decrease. Thus, changes in the MFD (denoted "ΔMFD") refer to the absolute value of the change.

Nano-Engineered Fibers ("nano-engineered fibers") have nano-engineered features in the form of relatively small aperiodically arranged airlines facilitate the guiding of optical-frequency electromagnetic waves in a glass fiber core in a manner that makes the optical fiber resistant to optical loss even when the fiber is bent to a small bending radius (i.e., the fiber is "bend resistant"). The nano-engineered fibers otherwise operate in the same manner as standard optical fibers. This is in contrast to photonic crystal fibers, which are constituted by a periodic array of relatively large holes formed in a dielectric medium (or by an array of dielectric tubes), wherein the guiding of optical-frequency electromagnetic waves is dictated by allowed and forbidden photonic energy bands defined by the array of holes. Nano-engineered fibers have airlines limited to a relative small airline-containing region wherein the air-fill percent (the area fraction of airlines to the area of the optical fiber times 100%, at a pre-selected cross-section) is less than about 1% and is usually about 0.02% to about 0.2% or about 0.3%. The term nano-engineered optical fiber (also sometimes referred to herein as micro-structured optical fiber) refers to an optical glass fiber comprising these nanometer-size features. In contrast, the holes in photonic crystal fibers occupy a large portion of the fiber and have an air-fill percent of 5% to 50%, i.e., at least five times greater, and more typically about two orders of magnitude greater than the nano-engineered fibers contemplated herein.

These important physical differences between these two types of fibers have practical implications in the connectorization process. In particular, collapsing the holes of a photonic crystal fiber necessarily causes a significant change in the fiber size and thus the MFD, which adversely impacts the connectorization process and the resulting connector. Consequently, the systems and methods described herein apply only to nano-engineered fibers and not to photonic crystal fibers.

Figure 2:
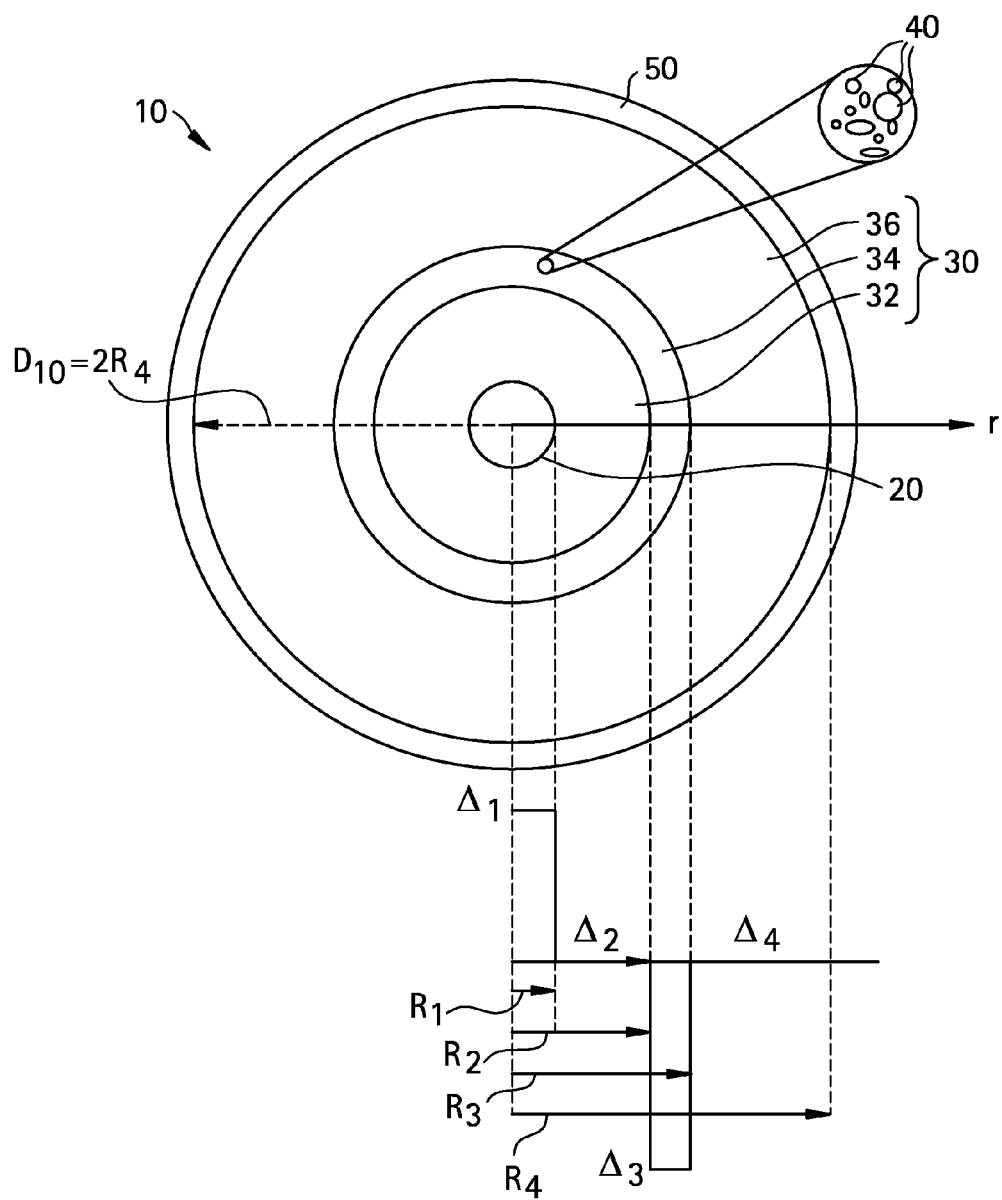
FIG. 2 is a cross-sectional view of the nano-engineered fiber of FIG. 1 as viewed along 2-2 therein, along with an example effective refractive index profile for the various fiber regions.

FIG. 1 is a side view of an example embodiment of a section of nano-engineered fiber ("nano-engineered fiber") 10 having opposite ends 12 and 14, and a centerline 16. FIG. 2 is a cross-sectional view of nano-engineered fiber 10 as viewed along the direction 2-2 of FIG. 1. Nano-engineered fiber 10 includes a core region ("core") 20 made up of a single core segment having a radius $R_1$ (the core radius $R_1$ is defined where $\Delta_1=0.04\%$ and is spaced apart from the centerline of the fiber) and positive maximum relative refractive index $\Delta_1$, a cladding 30 having an annular inner cladding region ("inner cladding") 32 with an inner radius $R_1$, an outer radius $R_2$ an annular width $W_{12}$ and a relative refractive index $\Delta_2$, an annular nano-engineered or "airline containing" depressed-index region 34 having an inner radius $R_2$, an outer radius $R_3$ an annular width $W_{23}$ and an relative refractive index $\Delta_3$, and an outer annular cladding region ("outer cladding") 36 having an inner radius $R_3$, an outer radius $R_4$, an annular width $W_{34}$ and a relative refractive index $\Delta_4$. Outer annular cladding 36 represents the outermost silica-based portion of nano-engineered fiber 10. The total diameter of the "bare" fiber 10 is $D_{10}=2R_4$. In an example embodiment $D_{10}=125$ microns, $\Delta_1=$approximately 0.34%, $R_1=$approximately 4.5 microns, $R_2=$approximately 10.7 microns, region 34 is comprised of 100 holes having a mean diameter of approximately 300 nm and a maximum diameter of <700 nm, $W_{23}=$approximately 4 microns, and $\Delta_2=\Delta_4=$approximately 0%. In another example embodiment $D_{10}=125$ microns, $\Delta_1=$approximately 0.34%, $R_1=$approximately 4.5 microns, $R_2=$approximately 13.6 microns, region 34 is comprised of 200 holes having a mean diameter of approximately 200 nm and a maximum diameter of <700 nm, $W_{23}=$approximately 3 microns and $\Delta_2=\Delta_4=$approximately 0%. (For example, both the inner cladding 32 and the outer cladding 36 may be made of pure silica ($SiO_2$) glass.) In yet another example embodiment $D_{10}=125$ microns, $\Delta_1=$approximately 0.34%, $R_1=$approximately 4.5 microns, $R_2=$approximately 13.6 microns, region 34 is comprised of 400 holes having a mean diameter of approximately 150 nm and a maximum diameter of <700 nm, $W_{23}=$approximately 3 microns and $\Delta_2=\Delta_4=$approximately 0%. In yet another example embodiment $D_{10}=125$ microns, $\Delta_1=$approximately 0.34%, $R_1=$approximately 4.5 microns, $R_2=$approximately 12.2 microns, region 34 is comprised of 500 holes having a mean diameter of approximately 120 nm and a maximum diameter of <700 nm, $W_{23}=$approximately 3 microns and $\Delta_2=$approximately 0%.

It is noted that in some embodiment's $\Delta_2$ may not be equal to $\Delta_4$. For example the inner cladding 32 and may be up-doped or down-doped relative to pure silica glass, while the outer cladding 36 and may either made of $SiO_2$ glass, or down doped or up doped by different amounts of dopants than the inner cladding 32.

A protective cover 50 is shown surrounding outer annular cladding 36. In an example embodiment, protective cover 50 includes one or more polymer or plastic-based layers or coatings, such as a buffer coating or buffer layer, for example.

In an example embodiment, an annular hole-containing region 34 is comprised of periodically or non-periodically disposed holes or "airlines" 40 that run substantially parallel to centerline 16 and that are configured such that the optical fiber is capable of single mode transmission at one or more wavelengths in one or more operating wavelength ranges. By "non-periodically disposed" or "non-periodic distribution," it will be understood to mean that when one takes a cross-section (such as a cross-section perpendicular to the longitudinal axis) of the optical fiber, the non-periodically disposed airlines are randomly or non-periodically distributed across a portion of the fiber. Similar cross sections taken at different points along the length of the fiber will reveal different cross-sectional airline patterns, i.e., various cross-sections will have different airline patterns, wherein the distributions of airlines and sizes of airlines do not match. That is, the airlines are non-periodic, i.e., they are not periodically disposed within the fiber structure. These airlines are stretched (elongated) along the length (i.e. in a direction generally parallel to the longitudinal axis) of the optical fiber, but do not extend the entire length of the entire fiber for typical lengths of transmission fiber. Typically the airlines extend less than 10 meters, e.g., 0.2 to 1 meter or less.

As mentioned above, the nano-engineered fibers 10 suitable for use in the present invention preferably include an air-fill percent less than about 1%, more preferably less than about 0.7%, and even more preferably less than about 0.3%, and even more preferably between about 0.02% and about 0.2%. An optical fiber suitable for use in the present invention further has an average hole size of about 0.3 microns or less, such as 0.15 or 0.09 microns and greater than 0.005 microns. In contrast, holey fiber available from NTT, Japan, has an average hole size of about 12 microns and an air-fill percent of >1%, and typical photonic crystal fibers have air-fill percents >5%. Thus, as mentioned above, it is the small airline size of the nano-engineered fibers considered herein that allows the fibers to retain their circularity and nominally their original size when the airlines are collapsed.

Further, because of the small size of airlines 40, fibers processed using the air hole collapsing methods of the present invention are capable of being ITU-T G.652 compliant in that a 125 μm fiber is ±1 μm in diameter for proper connectorization processing after subjecting the fiber to the air hole collapsing method because of the less than 1% air-fill percent. In contrast, photonic crystal fiber, after collapsing the air holes therein, has a diameter change far greater than ±1 μm, and thus is not ITU-T G.652 compliant for connectorization. Thus, the methods of the present invention are able to collapse airlines 40 at the end of the fiber, while the end of the fiber retains about the same shape, cross-sectional diameter, and circularity, making the fibers and methods advantageous for mounting within a ferrule prior to closing the airlines, without risk of the fiber debonding from the ferrule upon hole closing, and without the fiber end becoming bulbous or otherwise deformed.

For a variety of applications, it is desirable for the airlines 40 of the nano-engineered fibers 10 to have greater than about 95% of the airlines (and preferably all of the airlines) exhibit a mean airline size in the cladding for the optical fiber that is less than 1550 nm, more preferably less than 775 nm, most preferably less than 390 nm and in some embodiments less than 250 nm and greater than 5 nm. Likewise, it is preferable that the maximum diameter of the airlines in the fiber be less than 7000 nm, more preferably less than 4000 nm, more preferably less than 1550 nm, and most preferably less than 775 nm and in some embodiments less than 300 nm. In some embodiments, the fibers disclosed herein have greater than 50 airlines, in some embodiments also greater than 200 airlines, and in other embodiments the total number of airlines is greater than 500 airlines, while still in other embodiments the total number of airlines is greater than 1000 airlines in a given optical fiber perpendicular cross-section. Of course, the most preferred fibers will exhibit combinations of these characteristics. Thus, for example, one particularly preferred embodiment of optical fiber would exhibit greater than about 200 airlines in the optical fiber, the airlines having a maximum diameter less than 1550 nm and a mean diameter less than 775 nm, for example, the maximum diameter is less than 775 nm and the mean diameter of about 200 nm, although useful and bend resistant optical fibers can be achieved using larger and greater numbers of airlines. The hole number, mean diameter, max diameter, and total void area percent of airlines can all be calculated with the help of a scanning electron microscope at a magnification of about 800×and image analysis software, such as ImagePro, which is available from Media Cybernetics, Inc. of Silver Spring, Md., USA.

Because the nano-engineered fibers 10 considered herein rely on the core-cladding index difference to guide light, the fiber can generally include germania or fluorine to adjust the refractive index of the core and/or cladding of the optical fiber, but these dopants do not have to be present in the annular region 34. The airlines (in combination with any gas or gases that may be disposed within the airlines) can be used to adjust the manner in which light is guided down the core of the fiber, particularly when the fiber is bent. The hole-containing region may consist of undoped (pure) silica, thereby completely avoiding the use of any dopants in the hole-containing region, to achieve a decreased refractive index, or the hole-containing region may comprise doped silica, e.g. fluorine-doped silica having a plurality of airlines.

In one set of embodiments, the core region includes doped silica to provide a positive refractive index relative to pure silica, e.g.—germania doped silica. The core region is preferably airline-free.

Such fiber can be made to exhibit single-mode behavior with a 20 mm diameter macrobend induced loss at 1550 nm of less than less than 0.5 dB/turn, even more preferably less than 0.1 dB/turn, still more preferably less than 0.05 dB/turn, yet more preferably less than 0.03 dB/turn, and even still more preferably less than 0.02 dB/turn; a 10 mm diameter macrobend induced loss at 1550 nm of less than 1 dB/turn, more preferably less than 0.5 dB/turn, even more preferably less than 0.2 dB/turn, still more preferably less than 0.01 dB/turn, still even more preferably less than 0.05 dB/turn.

The nano-engineered fibers considered herein also include multi-mode nano-engineered fibers that comprise, for example, a graded-index core region and a cladding region surrounding and directly adjacent to the core region, the cladding region comprising a depressed-index annular portion 34 comprising a depressed relative refractive index, relative to another portion of the cladding (which preferably is silica that is not doped with an index of refraction altering dopant such as germania or fluorine). Preferably, the refractive index profile of the core has a parabolic shape. The depressed-index annular portion may comprise glass comprising a plurality of airlines, for example either a pure silica or a fluorine-doped glass comprising a plurality of airlines. The depressed index region can be adjacent to (not shown) or spaced apart from the core region 20.

The multi-mode nano-engineered fibers considered herein also exhibit very low bend induced attenuation, in particular very low macrobending. In some embodiments, high-bandwidth is provided by a low maximum relative refractive index in the core, and low bend losses are also provided. In some embodiments, the core radius is large (e.g. greater than 10 microns, for example 25 to 31.25 microns), the core refractive index delta is approximately 2% or less (e.g. 2.0%, 1.0%, 0.90%, or 0.50%), and the macrobend losses are low. Preferably, the multi-mode optical fiber disclosed herein exhibits a spectral attenuation of less than 3 dB/km at 850 nm In an example embodiment, core 20 and cladding 30 are configured to provide improved bend resistance, and single-mode operation at wavelengths preferably greater than or equal to 1500 nm, in some embodiments also greater than about 1310 nm, in other embodiments also greater than 1260 nm. The optical fibers provide a MFD at a wavelength of 1310 nm preferably greater than 8.0 microns, more preferably between about 8.0 and 10.0 microns.

The nano-engineered fibers considered herein may also be nano-engineered fibers that comprise voids or hole(s) in the fiber core. The depressed-index annular portion may comprise glass comprising additional plurality of airlines, fluorine-doped glass, or fluorine-doped glass comprising a plurality of airlines. It is noted that nano-engineered fiber with different refractive index profiles or geometries other than those disclosed herein, that contain a plurality of holes or voids may also be utilized.

Example Effective Index Parameters

In one set of embodiments a single-mode fiber has the following characteristics: $0.30\%<\Delta_1<0.40\%$, and $3.0\ \mu m<R_1<5.0\ \mu m$. In some embodiments, core 20 has a refractive index profile with an alpha shape, where in some embodiments alpha is 6 or more, while in other embodiments alpha is 8 or more. An example embodiment of a multi-mode fiber, has the following radius $12.5\ \mu m \leq R_1 \leq 40$ microns. In some embodiments, $25\ \mu m \leq R_1 \leq 32.5\ \mu m$, and in some of these embodiments, $R_1$ is greater than or equal to about 25 microns and less than or equal to about 31.25 microns. In an example embodiment, core 20 preferably has a maximum relative refractive index (sometimes called $\Delta_{1MAX}$) of $0.5\% \leq \Delta_1 \leq 2.0\%$. In yet another embodiment, core 20 has a maximum relative refractive index $0.9\% \leq \Delta_1 \leq 1.1\%$. In yet another embodiment, core 20 has a maximum relative refractive index $0.4\% \leq \Delta_1 \leq 0.5\%$.

In an example embodiment, the hole-containing region 34 has an inner radius $R_2 \leq 20\ \mu m$. In some example embodiments, $10\ \mu m \leq R_2 \leq 20\ \mu m$. In other embodiments, $10\ \mu m \leq R_2 \leq 18\ \mu m$. In other embodiments, $10\ \mu m \leq R_2 \leq 14\ \mu m$. In some embodiments, the inner annular cladding radial width $W_{12} \geq 1\ \mu m$. In an example embodiment, radius $R_2 > 5\ \mu m$, and more preferably $R_2 > 6\ \mu m$.

Again, while not being limited to any particular width, in an example embodiment, the hole-containing region 34 has a radial width $0.5\ \mu m \leq W_{23}$, while in other example embodiments $0.5\ \mu m \leq W_{23} \leq 20\ \mu m$. In other embodiments, $2\ \mu m \leq W_{23} \leq 12\ \mu m$. In other embodiments, $2\ \mu m \leq W_{23} \leq 10\ \mu m$. In an example embodiment, the annular hole-containing region 34 has a regional void area percent of less than about 30 percent and greater than 0.5 percent, and the non-periodically disposed airlines have a mean diameter of less than 1550 nm. In some embodiments region 34 has a regional void area percent of less than about 10% and greater than about 0.5% and a mean hole diameter of less than about 775 nm and greater than about 5 nm. In some embodiments region 34 has a regional void area percent of less than about 6% and greater than about 0.5% and a mean hole diameter of less than about 300 nm and greater than about 5 nm.

Figure 3:
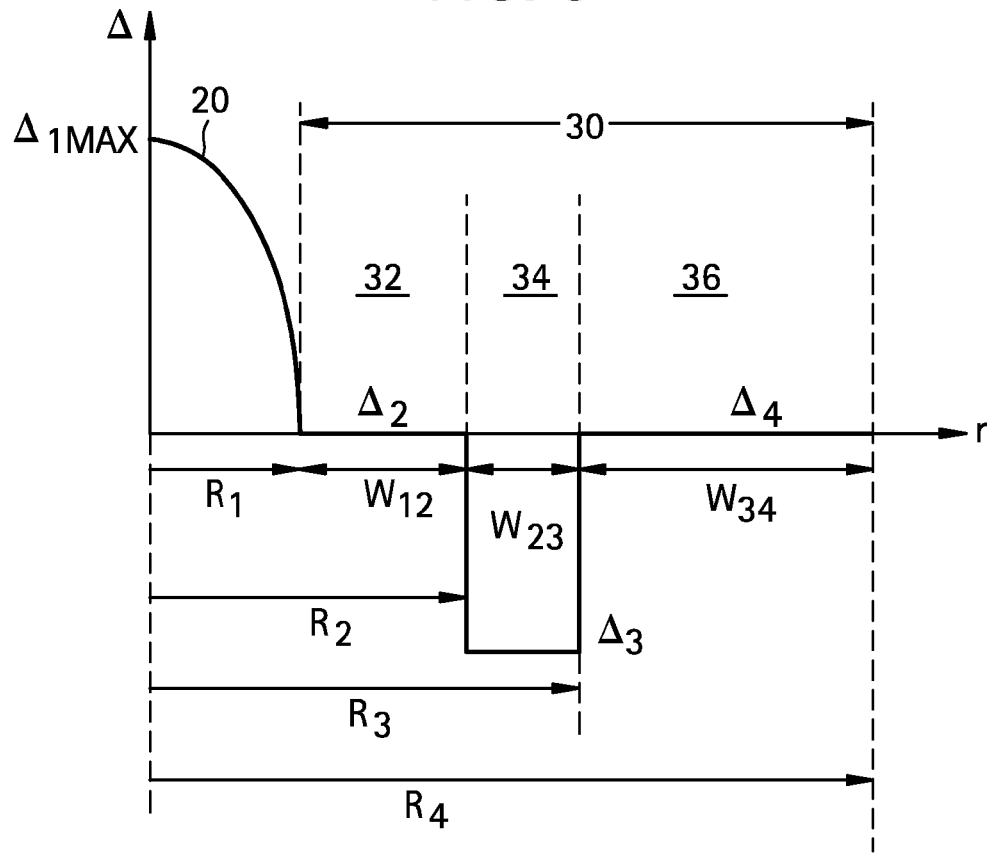
FIG. 3 is a plot of an example effective refractive index profile for an example nano-engineered fiber that has a varying-index core.

FIG. 3 is a plot of the effective refractive index $\Delta$ vs. radius r, similar to the effective refractive index plot included in FIG. 2, for an example embodiment of a refractive index profile for multi-mode version of nano-engineered fiber 10. Here, the reference refractive index $n_c$ for the effective index calculation is the average for inner annular cladding 32. (Typical wavelength for use in multimode fibers is about 850 nm). Core region 20 has a continuously varying positive effective refractive index $\Delta_1$ with a maximum $\Delta_{1MAX}$ at r=0 (i.e., at centerline 16). Outer annular cladding 36 has a substantially constant effective refractive index $\Delta_4$, and in an example embodiment $\Delta_4 = \Delta_2 = 0\%$. The hole-containing region 34 has a depressed index $\Delta_3$.

In some embodiments, the inner annular cladding 32 has a relative refractive index $\Delta_2$ having a maximum value $\Delta_{2MAX} < 0.05\%$, and $-0.05\% < \Delta_{2MAX} < 0.05\%$. In an example embodiment, the effective refractive index $\Delta_3$ of hole-containing region 34 is the same as $\Delta_2$ at radius $R_2$ (i.e., $\Delta_2(R_2) = \Delta_3(R_2)$).

In some embodiments, the outer annular portion 36 has a relative refractive index $\Delta_4$ having a maximum value $\Delta_{4MAX}$<0.05%, while in other example embodiments, −0.05%<$\Delta_{MAX}$<0.05%. In an example embodiment, $\Delta_4(R_3)$=$\Delta_3(R_3)$).

In some embodiments, the inner annular cladding region 32 comprises pure silica. In some embodiments, the outer annular cladding region 36 comprises pure silica. In some embodiments, the depressed-index hole-containing region 34 comprises pure silica with a plurality of airlines 40. Preferably, the minimum relative refractive index, or average effective relative refractive index $\Delta_3$, such as taking into account the presence of any airlines, of the depressed-index annular portion 34 preferably satisfies $\Delta_3$<−0.1%. In example embodiments, airlines 40 contain one or more gases, such as argon, nitrogen, or oxygen, or the airlines contain a vacuum with substantially no gas; regardless of the presence or absence of any gas, the effective refractive index $\Delta_3$ in the annular portion 34 is lowered due to the presence of airlines 40.

As discussed above, airlines 40 can be randomly or non-periodically disposed in the annular portion 34 of cladding 30, and in other embodiments, the airlines are disposed periodically. In some embodiments, the plurality of airlines 40 comprises a plurality of non-periodically disposed airlines and a plurality of periodically disposed airlines. Alternatively, or in addition, the depressed index of annular hole-containing region 34 can also be provided by downdoping this region (such as with fluorine) or updoping one or more of the cladding regions 32 and 36 and/or the core 20, wherein the depressed-index hole-containing region 34 is, for example, pure silica or silica that is not doped as heavily as the inner annular cladding region 32.

Preferably, radius $R_1$>4 μm. In some embodiments, the minimum relative refractive index $\Delta_{3MIN}$<−0.10%; in other embodiments, $\Delta_{3MIN}$<−0.20%; in still other embodiments, $\Delta_{3MIN}$<−0.30%; in yet other embodiments, $\Delta_{3MIN}$<−0.40%.

In an example embodiment, $\Delta_{1MAX}$≤2.0%, more preferably $\Delta_{1MAX}$≤1.0%, even more preferably $\Delta 1_{MAX}$<1.0%, and still more preferably $\Delta 1_{MAX}$≤0.8%; in some embodiments 0.4%≤$\Delta_{MAX}$≤1.0%, and in other embodiments 0.5%≤$\Delta 1_{MAX}$≤0.75%.

Figure 4:
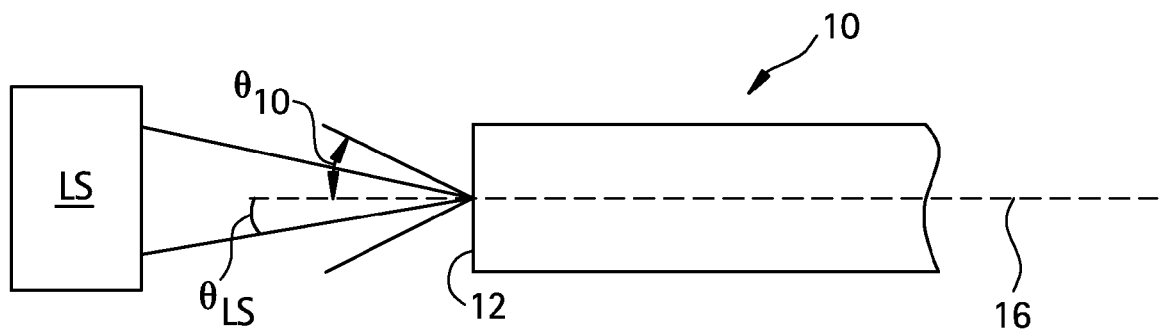
FIG. 4 is a close-up view of an end of a nanostructure fiber coupled to a light source, with the numerical aperture (NA) of the optical fiber being greater than that of the light source.

In an example embodiment, the numerical aperture (NA) of optical fiber 10 is given by $NA_{10}$=n sin $\theta_{10}$ and is preferably greater than the numerical aperture $NA_{LS}$=n sin $\theta_{LS}$ of an optical light source LS optically coupled to an end 12 of nano-engineered fiber 10, as shown in FIG. 4. For example, the $NA_{10}$ of the optical fiber is preferably greater than the NA of a vertical-cavity surface-emitting laser (VCSEL) source.

Multimode nano-engineered fibers 10 are discussed in U.S. patent application Ser. No. 12/004,174, entitled "Bend-resistant multimode optical fiber," filed on Dec. 20, 2007, and incorporated by reference herein. The bandwidth of the multi-mode version of nano-engineered fiber 10 varies inversely with the square of $\Delta_{1MAX}$. For example, a multi-mode optical fiber 10 with $\Delta_{1MAX}$=0.5% can yield a bandwidth 16 times greater than an otherwise identical multi-mode optical fiber 10 with $\Delta_{1MAX}$=2.0%. For example, using the designs disclosed herein, fibers can been made which provide (a) a bandwidth of greater than 750 MHz-km, more preferably greater than 1.0 GHz-km, and even more preferably greater than 2.0 GHz-km, and most preferably greater than 3.0 GHz-km at a wavelength of 850 nm. These high bandwidths can be achieved while still maintaining a 1 turn 10 mm diameter mandrel wrap attenuation increase at a wavelength of 1550 nm, of less than 0.5 dB, more preferably less than 0.3 dB, and most preferably less than 0.2 dB. Similarly, these high bandwidths which exhibit such impressive bend performance at 1550 nm can also maintain a 1 turn 10 mm diameter mandrel wrap attenuation increase at a wavelength of 850 nm of less than 1.5 dB, more preferably less than 1.0 dB, and most preferably less than 0.62 dB.

In some embodiments, 12.5 μm≤$R_1$≤40 μm, i.e. diameter $2R_1$, of core 20 diameter is between about 25 and 80 μm. In other embodiments, $R_1$>20 microns. In still other embodiments, $R_1$>22 microns. In yet other embodiments, $R_1$>24 microns.

Nano-Engineered Fiber Hole Closing Method

The embodiments of the present invention discussed herein provide method(s) for collapsing airlines 40 in the cladding region 30 of nano-engineered fibers 10 so as to perform optical fiber connectorization in a manner that provides the following advantage(s): the method minimizes or has no impact on: (i) fiber shape; (ii) the MFD for single-mode fibers (or core diameter in the case of multi-mode fibers) (iii) and/or the outer cladding diameter, and facilitates the connectorization process by processing (including closing holes) the fiber end face.

According to some embodiments, a method for closing the holes on the end face of a nano-engineered fiber having a core, a cladding with non-periodically disposed airlines, and at least one of a coating and a buffer, comprises the steps of:

cleaving the fiber portion, thereby forming a cleaved end face; and applying a predetermined amount of laser beam energy to the cleaved end face, the amount of energy being sufficient to collapse and seal the airlines exposed at the cleaved end face, to provide a fiber end face having no airlines Preferably, the voids (airlines) are sealed at the cleaved end face only to a depth of less than 11 μm. The collapsed airlines are preferably collapsed to a depth of less than 11 μm.

Preferably, the method includes the step of stripping a length of at least one of the coating and the buffer to expose an end section of the optical fiber prior to cleaving. Preferably the energy is applied via a laser beam applied directly to the end face of the fiber. Preferably the laser beam is supplied by a $CO_2$ laser. Preferably the heat from the laser beam mostly provides surface flux at the end face of the fiber and penetrates and thus collapses the holes to a depth of less than 11 μm, preferably less than 5 μm, and preferably no more than 2 μm (the depth is measured from the end face of the fiber). Preferably, less than 20 J/cm$^2$ of energy is delivered to the end face of the fiber, and if the laser is capable of supplying more energy, the excess energy should be preferably diverted prior to reaching the fiber. This can be done, for example, by expanding the laser beam; inserting partial transmission devices in the beam path; and/or inserting beam splitters in the beam path There are several ways of controlling the energy delivered to the end face of the fiber, for example:

1) Controlling the number of pulses of laser energy delivered;

2) Controlling pulse duration of the individual pulses;

3) Controlling rest time between pulses;

4) Controlling the delivered intensity of the pulse.

For example, if a laser controller is used in conjunction with the laser, the number of pulses supplied by the laser is determined by the pulse count into the laser controller. Thus the desired number of pulses can be easily obtained. Likewise, the pulse duration out of the laser is easily controlled choosing the pulse duration that in within the operational range of the laser (for example, a $CO_2$ laser used in some of the embodiments has a documented rise time on the order of 75 μSec and it may be difficult to repeatedly control the pulse duration if it is below that value). Preferably, the surface temperature of the end face of the fiber is between the softening point of the fiber material (e.g., about 1600° C. for silica) more preferably above 2000° C., and below its vaporization point (e.g., about 2700° C. for silica) more preferably below 2600° C. The laser intensity (per pulse) is determined, for example, by the laser cavity design. To reduce the intensity delivered to the fiber end face, some of the laser beam energy provided by the laser can be diverted (so that id does not reach the fiber end face), or absorbed, or the laser beam can expanded prior to impinging on the fiber end face. Hence, the total energy delivered to the end face of the fiber may be controlled by proper selection of the above parameters. In addition the depth d of the closed voids may be controlled by the pulse duration and rest time between pulses.

Nano-Engineered Fiber Connectorization Methods

According to another embodiment, a method of connectorizing an optical fiber comprising, in order, the steps of:

providing a nano-engineered fiber having a core, a cladding with non-periodically disposed voids, and at least one of a coating and a buffer;

stripping a length of the at least one of the coating and the buffer to expose an end portion of the optical fiber;

mounting the optical fiber within a connector ferrule having a ferrule end face so that the exposed portion of the fiber protrudes beyond the ferrule end face; and cleaving the exposed optical fiber portion that protrudes beyond the ferrule end face, forming a cleaved end face;

optionally mechanically polishing fiber and ferrule end face selectively applying a predetermined amount of energy to cleaved (and optionally polished end-face, if the polishing step was performed) sufficient to collapse and seal the voids exposed at the cleaved end face, to provide a fiber end face having no voids. Preferably the voids are exposed at the cleaved end face and sealed only to a depth of less than 11 μm. Thus, preferably, the fiber region with closed voids does not have a length d of larger than 11 μm, and preferably less than 5 μm.

Thus, according to at least one embodiment, the optical fiber is first inserted into a connector ferrule, and cleaved. Preferably, the cleaved end face of the bare fiber is then polished. Preferably the fiber end face is situated in a common plane with the ferrule end face. Subsequently, the airlines are collapsed by being exposed to a predetermined amount of energy from a laser beam.

EXAMPLES

The invention will be further clarified by the following examples.

Example 1

Figure 5A:
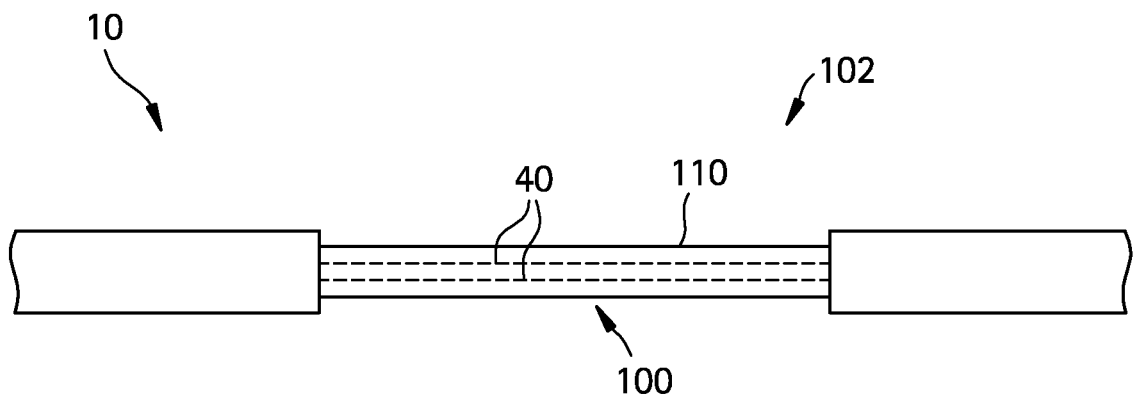
FIG. 5A is a side view of a nano-engineered fiber with a bare section formed at a mid-span location.
Figure 5B:
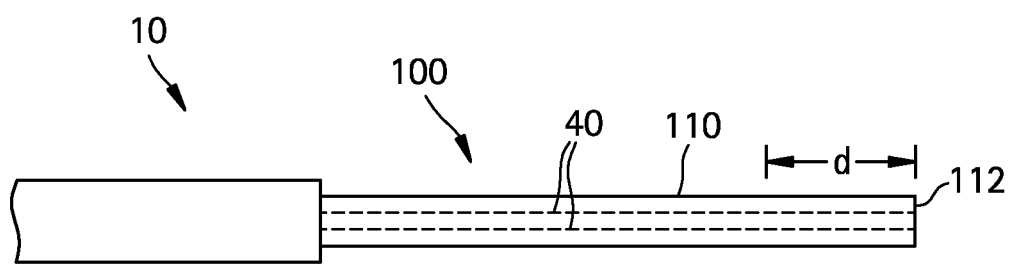
FIG. 5B is similar to FIG. 5A, and shows the nano-engineered fiber cut at one end of the mid-span location to form a fiber end face.

An example embodiment of a method for processing a nano-engineered fiber 10 for connectorization is now described. With reference to FIG. 5A and FIG. 5B, the method includes preparing the optical fiber by stripping the buffer and/or coating layer 50 from the optical fiber over a specified region to expose a length or section of bare fiber 110 as shown in FIG. 5A. The fiber is then cut to form a fiber end face 112 (FIG. 5B). Bare fiber 110 is then optionally cleaned e.g., with isopropyl alcohol solvent. Bare fiber 110 needs to be sufficiently long to allow for fiber installation into an optical connector, allowing the bare fiber to extend through the length of a connector ferrule, as discussed further below. Airlines 40 are shown schematically by the parallel dashed lines in bare fiber 110.

Figure 5C:
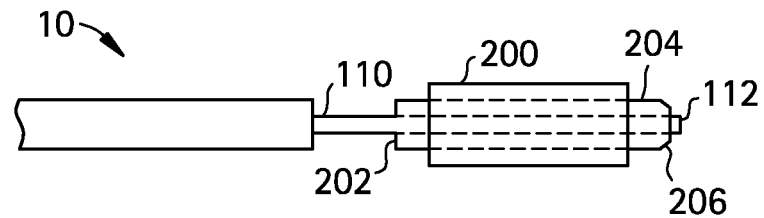
FIG. 5C is the step, where the fiber end section is inserted into a connector ferrule with a portion of the fiber end section protruding beyond the ferrule end face.
Figure 5D:
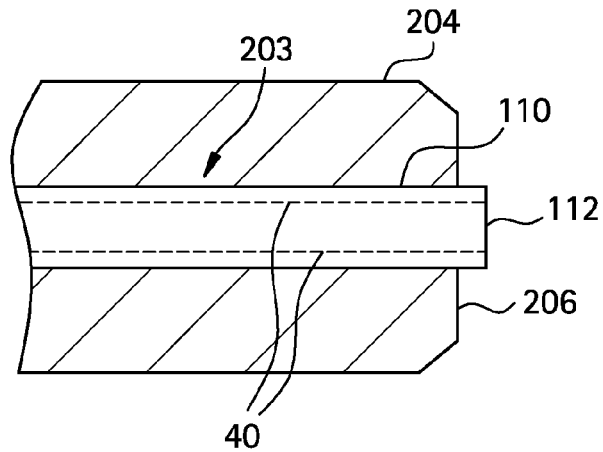
FIG. 5D is a close-up view of the ferrule end showing the ferrule end face and the fiber end section protruding from the ferrule channel beyond the ferrule end face.

After stripping and cleaning, with reference to FIG. 5C the bare fiber is inserted into an input end 202 of a central bore 203 (see FIG. 5D) of a connector ferrule 204 contained within an optical connector housing 200. The insertion is performed so that there is some length of bare fiber 110 that protrudes beyond ferrule output end face 206. (FIG. 5D is a close-up view of ferrule end face 206 of FIG. 5C).

As part of the connectorization process, bare fiber 110 is then precision cleaved as close as possible to the ferrule output end face 206 so that the new fiber end face 112 is formed by the precision cleaving. Preferably, the new end face 112 of bare fiber 110 is positioned coplanar with the ferrule end face 206.

The fiber end face 112 includes a plurality of airlines 40 and may include hackle (uneven surface structure) produced by cleaving. The hackle may be primarily caused by a poor cleave. It is noted that the presence of holes may contribute to the poor cleave.

Figure 5E:
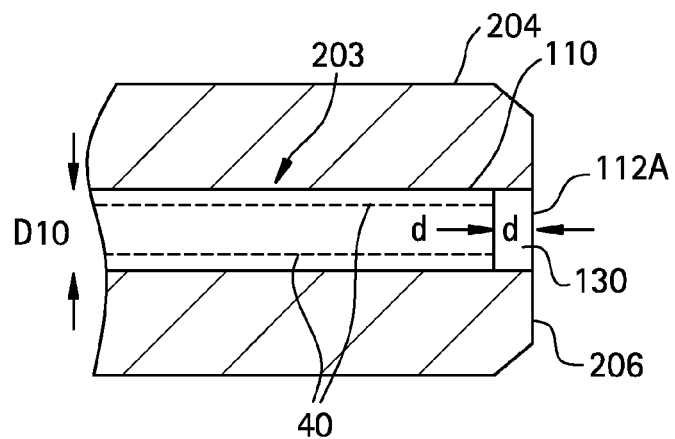
FIG. 5E is similar to FIG. 5D and shows the fiber after it is cleaved near the ferrule end face, polished so that the polished fiber end coincides with the ferrule end face and is void free (i.e., solid); and after the void-free region is formed at the end face of the fiber.

Following this precision cleave step, the fiber end face is subjected to localized heat sufficient to close airlines 40 in airline-containing region 34 (FIG. 2) to form an airline-free end face 112A and an airline free region 130 extending a small axial distance d (i.e., the distance along the fiber) from fiber end face 112A (see FIG. 5E), wherein in an example embodiment d is less than ⅕ of one fiber diameter ($d \leq 0.2D_{10}$). In some embodiments d is less than ⅛ of one fiber diameter ($d \leq 0.125D_{10}$). In some embodiments $d \leq 0.1D_{10}$. Preferably, according to some embodiments, the distance d less than 11 μm. In one example embodiment $d \leq 5$ μm). In some example embodiments, $d \leq 3$ μm, or $d \leq 2$ μm.

Localized heating of the fiber end face may be generated by a laser beam, for example such that the energy from the laser is deposited primarily on the surface of the end face and primarily extends to a depth d, such that the voids are collapsed to the depth d. Other sources of heat (e.g., electrodes, or a flame) tend to deform the end face 112A, because the heat generated by such sources penetrates too far into the glass (for example by 35 μm, 75 μm, or more) or heats large areas and thus may also destroy a connector ferrule. The laser beam should preferably directly intercept the end face of the fiber and preferably not the rest of the fiber. For example, the optical axis of the output beam, in the following embodiments, intercepts the fiber end face. More specifically the optical axis of the laser beam, is preferably positioned within approximately ±45° (and preferably ±15°, and more preferably normal to the end face of the fiber) and the laser beam diameter should be preferably not larger than the diameter of the bare fiber 110. If the laser beam intercepts the end face of the fiber at an angle (so that its optical axis is not normal to the fiber end face), the beam intensity on the fiber end face will be less uniform.

Figure 6A:
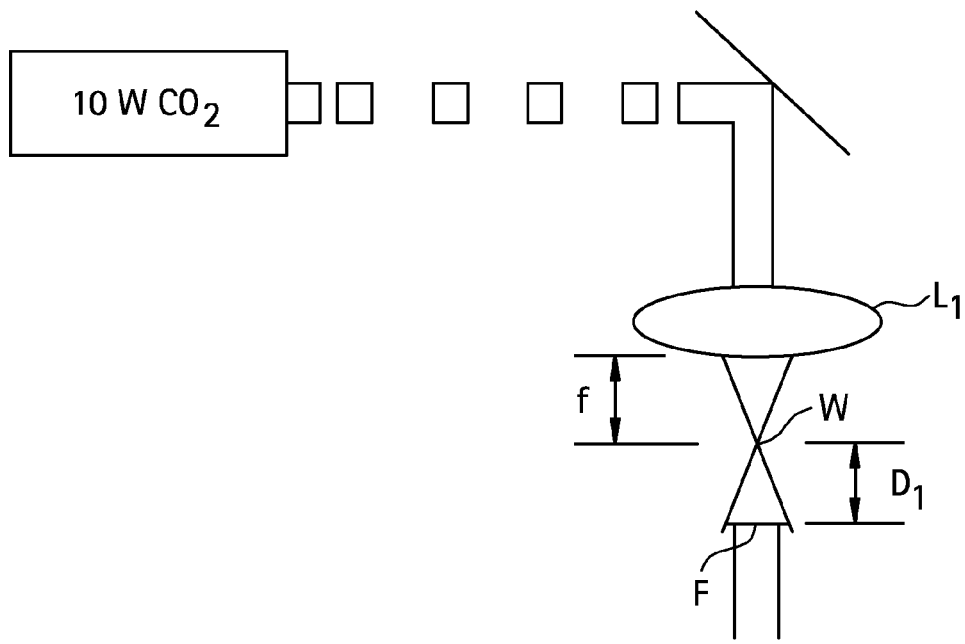
FIG. 6A illustrates schematically a laser and a lens that direct a laser beam to the end face of the cleaved fiber.
Figure 6B:
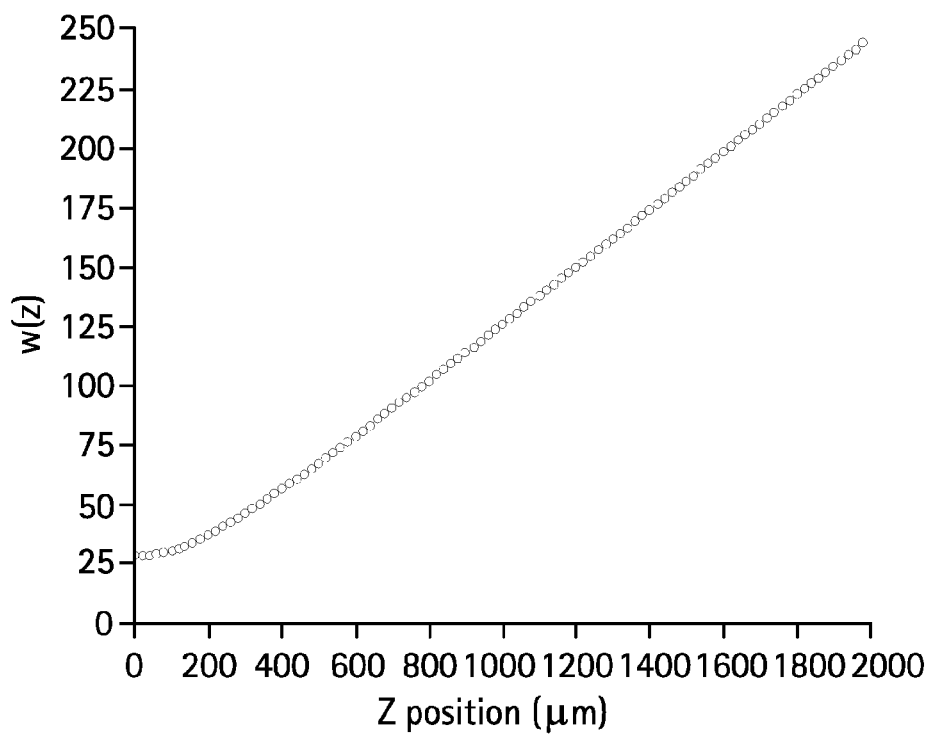
FIG. 6B is a plot of the laser beam radius vs. the distance from the beam waist formed by the lens of FIG. 6A.

Some exemplary laser beam diameters are 5 μm, 125 μm, for example: 100 μm, 80 μm, 75 μm, 60 μm, 55 μm, or 10 μm. Such beam sizes may be provided for example, by use of a focusing lens. In the present example embodiment, the closure of the holes on the end face 112A is accomplished by a laser beam 122 from the laser 120 that provides a laser beam of a predetermined wavelength, intensity and duration. In the embodiment of FIG. 6A, the focusing lens (with a focal length f=60 mm), when used in conjunction with a $CO_2$ laser beam, created a beam waist of about 55 μm in diameter. FIG. 6B illustrates one exemplary relationship between the laser beam radius w and the location of the beam, different distances z away from the beam waist location. (Please note that w is the distance from the beam axis where the beam intensity drops to $1/e^2$ (approximately 13.5%) of its maximum value.) Thus, larger beam size diameters were provided to the end face 112 by placing the end face 112 a predetermined distance away from the beam waist location. For example, to achieve a 125 μm diameter beam, the end face of the fiber is situated 100 μm away from the beam waist location. It is noted that the laser beam incident at the end face of the fiber may be ring-shaped, or have a shape that substantially matches that of the fiber region containing the voids, so that the beam is incident only on the area containing the voids.

Preferably, the laser beam characteristics are such that the energy from the laser beam is deposited primarily on the surface of the fiber's end face and extends to a depth on the order of the depth d. According to some embodiments, the wavelength of the laser is preferably either above or below the transmission band of the optical glass of the fiber. Thus, according to some embodiments, the wavelength of the laser is, for example, below 200 nm, and preferably below 150 nm. One exemplary laser is an excimer F2 153 nm laser. According to other embodiments the wavelength of the laser is, for example, longer than 2.5 μm or more preferably longer than 4.5 μm. Some exemplary laser that can be utilized are a 5 μm carbon monoxide laser, or a 10.6 μm $CO_2$ laser. A suitable $CO_2$ laser for use in carrying out the method of the present invention is, for example, a 10 W $CO_2$ laser, model 48-1, available from Synrad Inc., Mukilteo, Wash., USA. The fiber end face 112 formed by the precision cleaving of fiber 110 is positioned such that the laser output beam be applied to the end face 112, will be positioned at the end of a connector ferrule after the installation and polishing processes are completed. The laser beam heats the end face 112 of the bare fiber 110 and causes airlines 40 therein to collapse, forming a small airline free region throughout the distance (depth) d. A steady-state thermal analysis estimates about 0.044 $W/cm^2$ radiant energy loss from the end face of a 125 μm diameter fiber (at 2600° C.). Thus, in order to maintain that temperature on the fiber end face, energy balance requires the same amount of energy flux must be supplied by the laser. If the surface area of the exemplary fiber of about 0.012 $cm^2$, then 0.0005 W of steady-state laser energy is needed to maintain that temperature on the fiber end face.

An analysis of the thermal capacitance indicates that about 0.495 mJ are required to raise a 10 μm long section of 125 micron diameter silica fiber to 2600° C. A 10 watt laser delivers this amount of energy in about 50 μSec. The typical rise time for a $CO_2$ laser is about 100 μSec. Thus, in order to provide adequate energy control it is preferable to attenuate or divert some of the energy out of the laser (for example, via beam expansion(s) and/or beam splitter(s)), while increasing the laser pulse duration.

A proper energy flux on the fiber end face 112 should be great enough to collapse the airlines but small enough not to cause glass ablation/vaporization. The output energy flux (energy density) on the fiber end surface is typically 0.1 $J/cm^2$ to about 20 $J/cm^2$, more preferably 1 $J/cm^2$ to 5 $J/cm^2$ (for a single fiber). The laser pulse duration will depend on the desired amount of flux on the end surface of the fiber, and is typically 100 μsec to 200 μsec. Preferably multiple pulses are utilized. Thus, one may need to use beam splitters or other sources of attenuation to reduce the laser beam power presented to the end face of the bare fiber 110, in order to allow the use of practical pulse durations (for example, $CO_2$ laser implementation, it is preferable to use pulse length of 100 μSec or more).

Therefore, the amount of flux (energy density) on the end face of fiber can be controlled with a very high amount of precision. The energy from the laser beam penetrates only a small depth into the fiber end face, heating the fiber end face, smoothing out any hackle, if present, and closing holes within a small distance d into the fiber end face.

Referring to FIG. 6A, the beam from a "low" power $CO_2$ laser (in this case a 10 watt $CO_2$ operating at λ=10.6 um) is pulse width modulated to control average power output. In this example embodiment, the laser is operated with a repetition rate of 5 kHz and varied pulse width. In this exemplary embodiment, the pulse width varied between 100 μSec and 200 μSec. The variation in pulse width was used to provide precise control over the pulse energy delivered to the end face 112 of the bare fiber 110. For the case of this embodiment an average pulse width (i.e., pulse duration) of about 200 μSec was used. Typically the pulse width will be between 100 μSec and 2000 μSec, for example between 100 μSec and 1500 μSec. The individual pulse energy can be found from the following equation:

$$\text{Pulse energy (J)} = (\text{Total Power (watts)}) * (\text{Pulse Duration (sec)}) = (10 \text{ watts} * 200 \times 10^{-6} \text{ sec}) = 2 \text{ milli-Joules}$$

The energy density is controlled by positioning the end face 112 of the fiber along the beam's optical axis at the appropriate position relative to the focal position of the lens (i.e., before, at, or behind the focal plane), to control the beam spot size (diameter). Thus, in this exemplary embodiment the pulse energy density is:

$$\text{Pulse Energy Density (J/μm2)} = (\text{Pulse Energy})/(\text{Beam Spot Size}) = 2 \text{ mJ}/\pi (138 \text{ μm})^2 = 3.34 \times 10^{-8} \text{ Joules/um}^2.$$

The energy delivered to the end face is:

$$\text{Energy/Pulse} = (\text{Pulse Energy Density}) * (\text{Cross-sectional Area of Fiber End face}) = 3.34 \times 10^{-8} \text{ Joules/um}^2 * \pi * (62.5 \text{ um})^2 = 0.4 \text{ milli-Joule}.$$

Typically the energy delivered to an end face 112 should be between 0.1 and 10 milli-Joules.

Thus, by controlling the beam size, number of pulses and pulse duration, the total energy delivered to the fiber end face 112 may be controlled. This provides a mechanism by which the surface melting of the end face may be precisely controlled, mitigating undesired effects. In this embodiment 23 pulses (about 200 μSec duration at a repetition rate of 1000/sec) were utilized. Thus, in this example, energy density was reduced to provide easy control of the total energy supplied by using a plurality of pulses. In addition, an aperture may be used to pass only a small portion of the beam to impinge solely on the optical fiber end face (not holder or ferrule material), and/or preferably only on the area containing holes.

Figure 5F:
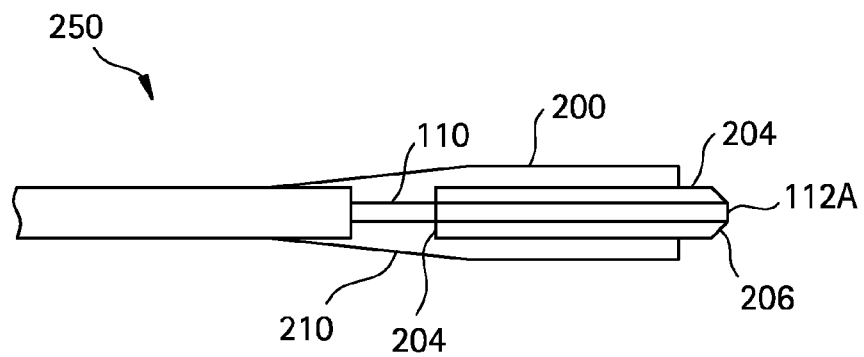
FIG. 5F is similar to FIG. 5E and shows the fiber with the void-free end face (i.e., solid) being co-planar with the ferrule end face.
Figure 7:
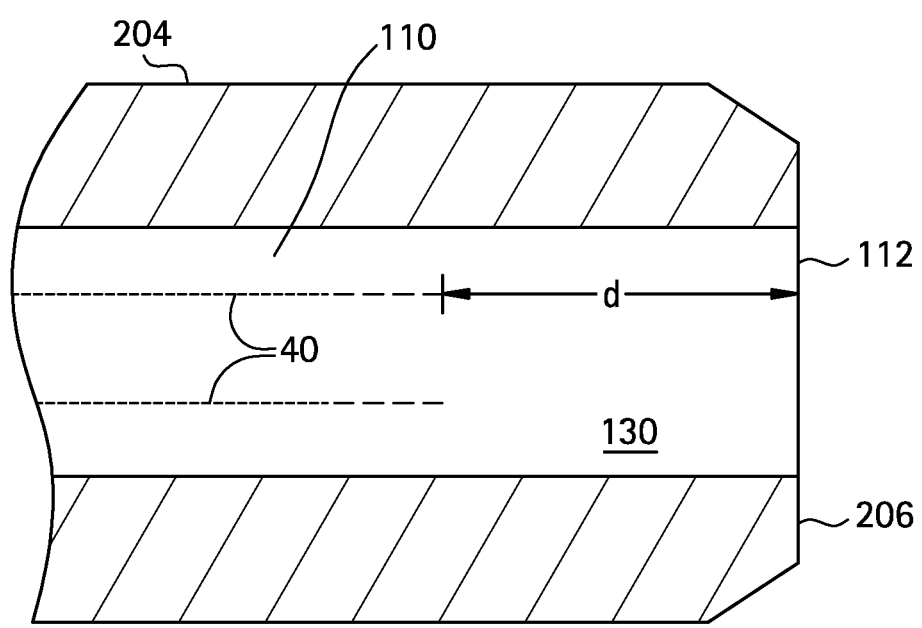
FIG. 7 is a close-up cross-sectional view similar to FIG. 5E, illustrating how the voids terminate to form the solid fiber end face.

The remaining connector parts (e.g., boot 210) are then added to or otherwise incorporated with connector housing 200 to form the connectorized optical fiber assembly 250 as illustrated in the cross-sectional view of FIG. 5F. FIG. 7 is a close-up cross-sectional view of ferrule end face 206, illustrating how airlines 40 terminate to form airline-free portion 130 at fiber end face 112. Distance d is the length of airline-free portion 130 as measured from the new (i.e., cleaved) end face 112 formed when bare fiber 110 is arranged in ferrule 204. The airlines stay present beyond that distance. In an example embodiment, about 0.5 μm≤d≤about 10 μm.

Figure 8A:
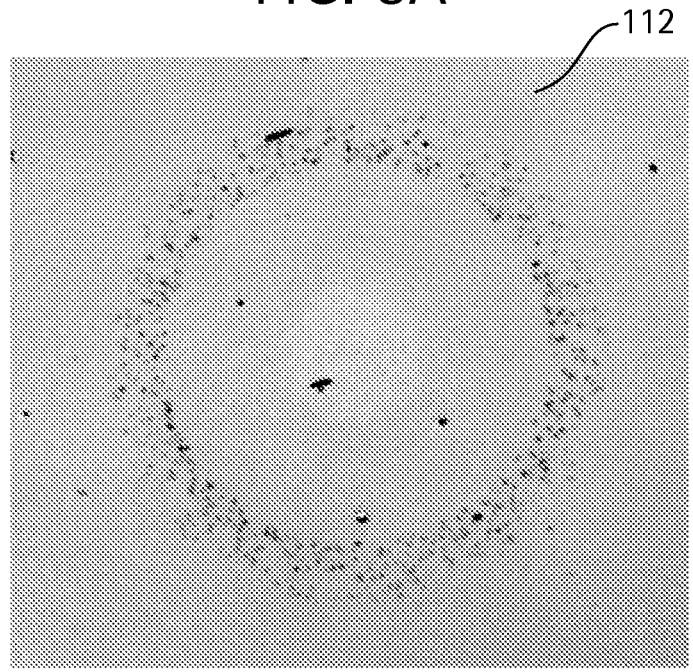
FIGS. 8A and 8B are photographs of the end face of the fiber before the voids were closed, and after the voids were closed, respectively.
Figure 8B:
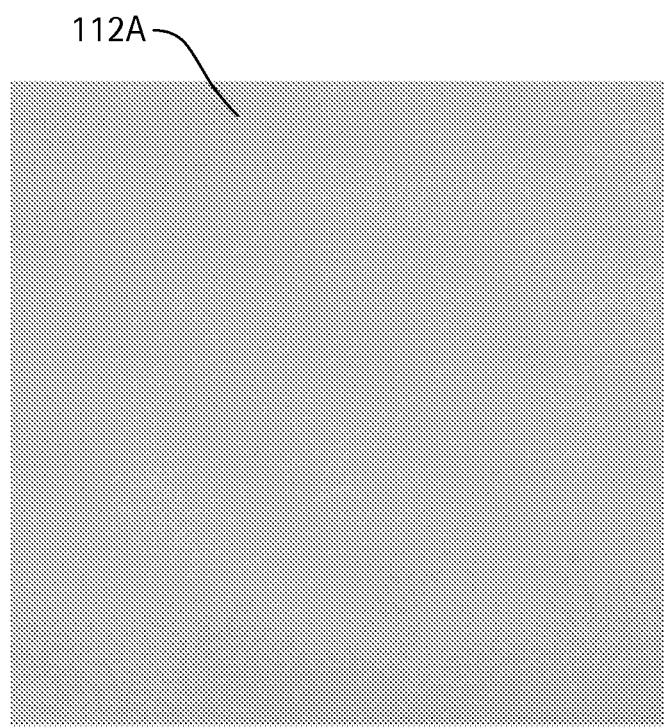
Figure 9A:
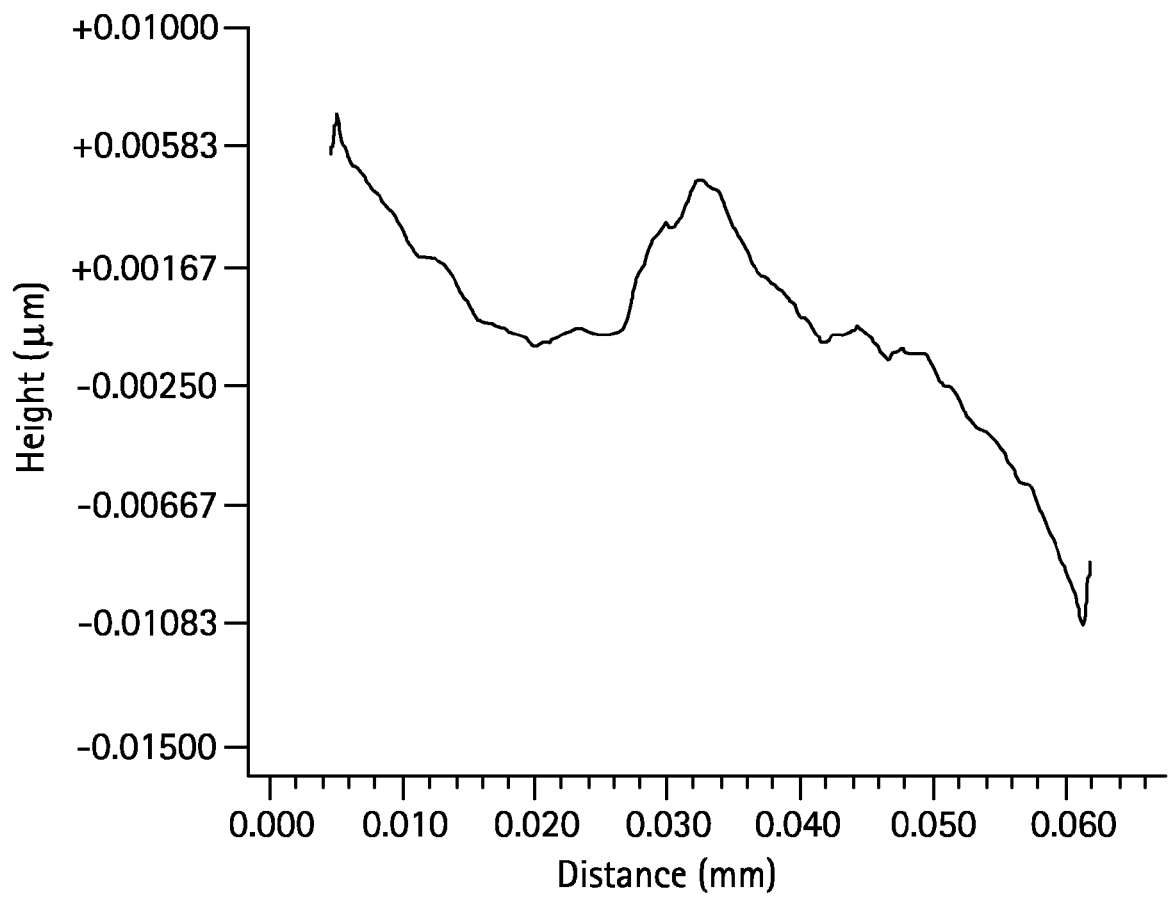
FIG. 9A is a plot of height of features across the central region of the end face of a nano-engineered fiber having a plurality of air holes.
Figure 9B:
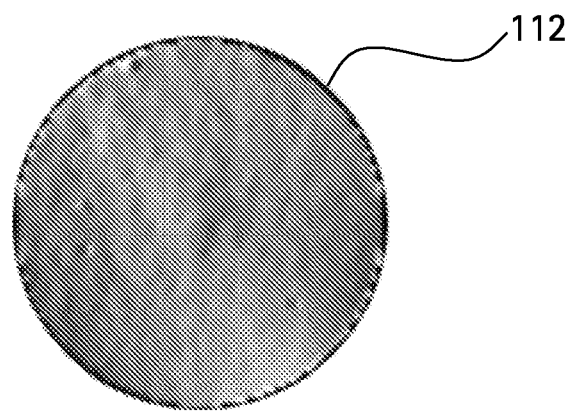
FIG. 9B is a grey scale representation of the topology of the central region of the end face of a nano-engineered fiber having a plurality of air holes.

FIG. 8A illustrates the end face 112 before the holes are closed, while FIG. 8B illustrates the end face 112A, after the holes are closed (and thus are not visible). FIGS. 9A, 9B and 10A, 10B demonstrate that there is minimal modification of the surface of the end face 112 of the fiber after the holes are closed. More specifically, FIG. 9A illustrates a surface profile of the end surface 112 prior to closure of the air holes. FIG. 9B is a gray scale representation of the topology of this surface.

Figure 10A:
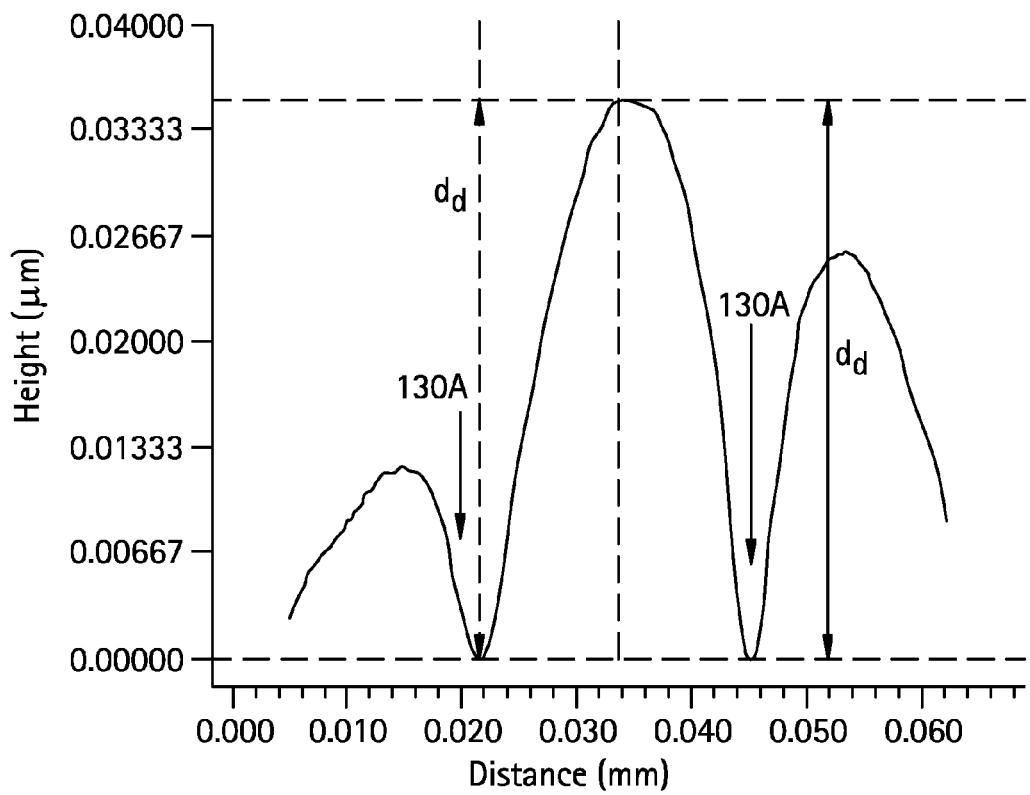
FIG. 10A is a plot of height of features across the central region of the end face of a nano-engineered fiber after the air holes were closed.
Figure 10B:
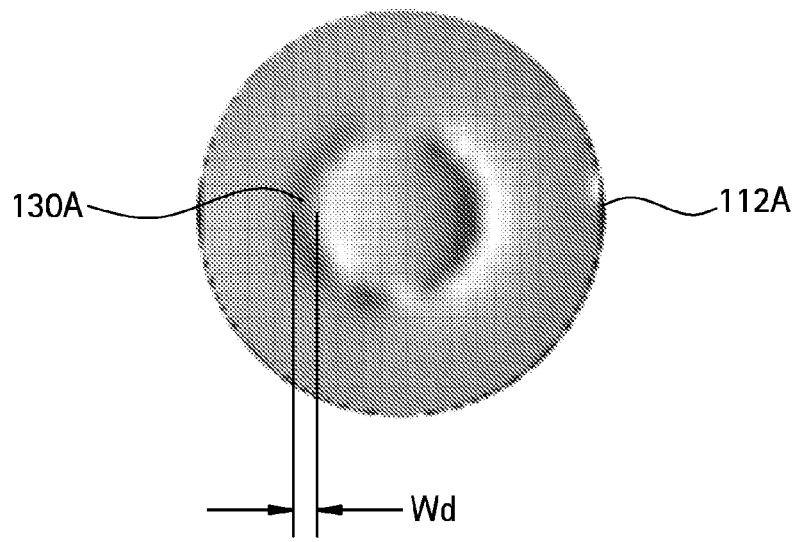
FIG. 10B is a grey scale representation of the topology of the central region of the end face of a nano-engineered fiber after the air holes were closed.

FIG. 10A illustrates a surface profile of the end surface 112A after the air holes are closed, and FIG. 10B is a gray scale representation of the topology of this surface. In some embodiments (for example, as shown in FIGS. 10A and 10B), the fiber end face 112A includes a shallow indentation (ring-shaped dimple) that is less than 1 µm deep, and typically no larger than 0.5 µm, for example, 0.003 µm to 0.3 µm. One exemplary indentation is shown, for example, in FIGS. 10A and 10B. (It is noted that a depth $d_d$ of 0.5 µm is smaller than the size of most dust particles). In some exemplary embodiments the indentation is 3 nm to 50 nm deep. In some exemplary embodiments the $d_d$ is about 0.03 to 0.04 µm. This dimple corresponds to the location of the previously present air hole containing region. In this embodiment, width $w_d$ of the dimple is larger than its depth $d_d$. For example, the depth of the dimple may be: $d_d \leq 0.5\ w_d$; $d_d \leq 0.25\ w_d$; or $d_d \leq 0.1\ w_d$. Since the depth of the dimple is very shallow and the aspect ratio $w_d/d_d$ is relatively large, and the end face 112A contains no (or much fewer) air holes, no significant amounts of dust or other contaminants can be imbedded at the end face 112A.

Thus, a method for closing the holes on the end face of a nano-engineered fiber having includes the step of applying a predetermined amount of energy to the end face of the fiber to cause the holes to close. Preferably, optical irradiation energy from a laser. In some embodiments, the wavelength of the laser is either above or below the transmission band of the optical glass of the fiber (for example, when an IR $CO_2$ laser is utilized). In some embodiments, the light absorption mechanism is primarily nonlinear (high peak optical intensity illumination). Nonlinear optical absorption (two photon absorption or plasma generation for example) can be applied within the transmission band of the glass of the optical fiber and in addition can be applied outside of the transmission band. Femtosecond Ti-Sapphire lasers operating in the 800 nm range can transfer energy to silica surfaces through plasma generation. In yet more embodiments multiple lasers with different wavelengths can be used together. An exemplary configuration would be to use a 10.6 µm $CO_2$ laser to generally heat the region containing airlines, and the adjacent areas, and then to supply additional energy and heating in a more localized lateral spot with laser that can be focused tighter because it has a shorter wavelength. This small spot could also be scanned. In yet more embodiments, dopants and defects in the glass can cause absorptions of sufficient strength to allow lasers within the transmission window to be used.

Preferably, the energy is delivered to a diameter just large enough to encompass all holes on the end face 112 of an optical fiber. Even more preferably, the energy is delivered only to the area on the end face 112 containing holes. For example, when the holes form a ring pattern on the end face of the fiber, this can be achieved by using a ring pattern illumination from a laser. Preferably the holes form a ring pattern on the end face of the fiber. The energy is preferably deposited on the surface of the end face of the fiber with shallow penetration depth (e.g., 0.5 µm to 5 µm)

Following the cleave step, the new fiber end face 112 is buffed and polished using standard polishing techniques known in the art so that the new fiber end face 112 is co-planar with ferrule end face 206. Standard polishing techniques will typically create some residual debris in the voids at the fiber end face. This debris is primarily ground up glass from the fiber end face and does not need to be removed as it is melted and incorporated back into the glass in the same step where the voids at the end face 112 are collapsed by a laser beam. The resulting fiber end face 112 is protected from external forces and contamination. Any residual water that may have made its way into the voids during a standard polishing process is preferably dried from the volume to be treated, prior to the laser beam sealing of the voids.

MFD Considerations for Single-Mode (SM) Fiber

One important consideration in connectorizing nano-engineered fibers is how the MFD is affected by forming an airline-free portion 130 using the methods described above. Maintaining the MFD of the nano-engineered fiber is important because mismatches in MFD between fibers cause attenuation when the two fibers are connected, e.g., via fusion splicing or via a fiber optic connector.

Our analysis indicates that either no change, or very small changes ΔMFD (often undetectable) of less than 0.5%, often less than 0.2% (for example ΔMFD being no more than 0.1%, or no more than 0.05%, or no more than 0.01%) occur in MFD for the optical fiber 10 when the laser beam is properly applied to the end of the fiber. This very small change can be attributed to small changes in the index of refraction profile of the fiber due to thermal diffusion of one or more dopants in the core region, and also a very short penetration depth (length of fiber) that is heated and collapsed. For example, the penetration depth is <10 µm, typically ≤3 µm, such as 0.5 µm to 2 µm.

Fiber Diameter Considerations

As discussed above, nano-engineered fibers 10, to which the methods of the present invention apply, have a relatively low air-fill percent of less than 1% and is usually about 0.02% to about 0.2%, in contrast to photonic crystal fibers, which have an air-fill percent of 5% to 20%, i.e., at least five times greater, and usually about two orders of magnitude greater. Thus, it is the small air-fill percent of the nano-engineered fibers considered herein that allows the fibers to retain their circularity and nominally their original size when the airlines are collapsed. This allows the processed fibers to remain compliant with the ITU-T G.652 standard wherein the (bare) fiber has a diameter $D_{10}$=125 µm±1 micron for proper connectorization.

In contrast, a photonic crystal fiber, after collapsing the air holes therein, has a diameter change far greater than ±1 micron, and thus is not ITU-T G.652 compliant for connectorization. Assuming that the relative air-fill percents correspond to the amount of fiber diameter change, then a photonic crystal fiber undergoes a diameter change of at least about 5× that of a nano-engineered fiber, and more typically about 100×. Thus, an overall change in $D_{10}$ for a 125 µm fiber of less than 0.6 µm, which would be acceptable for connectorizing a nano-engineered fiber 10, would translate into a change of at least 2.5 µm and more typically a change of about 5 to 50 µm when the method is applied to a photonic crystal fiber—a change that would be deemed unacceptable for the connectorization contemplated by the present invention.

The methods of the present invention are able to collapse airlines 40 in nano-engineered fiber 10 while retaining substantially the same cross-sectional diameter $D_{10}$ and circularity, making the fibers and methods advantageous for mounting the processed nano-engineered fiber within a ferrule in the course of forming a connectorized fiber.

In an example embodiment, the change $\Delta D_{10}$ in the diameter $D_{10}$ of fiber 10 at airline-free region 130 as compared to the other non-processed (i.e., airline-inclusive) regions of the fiber is less than or equal to 1% (0.125 µm), more preferable less than or equal to 0.50% (0.625 µm), even more preferably less than or equal to 0.24% (0.30 µm), and even more preferably less than or equal to 0.08% (0.10 µm). The numbers in parenthesis are the actual values for a 125 µm diameter fiber. (Please note that 1% change in the fiber diameter would correspond to the airline volume fraction equal to 1%, where the entire cross section of the fiber contained airlines, and where the all of airlines were completely closed.)

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A method of connectorizing an optical fiber comprising, in order, the steps of:
   (a) providing a nano-engineered fiber having a core, a cladding with non-periodically disposed voids, and at least one of a coating and a buffer;
   (b) stripping a length of the at least one of the coating and the buffer to expose an end portion of the optical fiber;
   (c) mounting the optical fiber within a connector ferrule having a ferrule end face so that the exposed portion of the fiber protruding beyond the ferrule end face; and
   (d) cleaving the exposed optical fiber portion that protrudes beyond the ferrule end face, forming a cleaved end face;
   (e) applying a predetermined amount of energy to cleaved end-face sufficient to collapse and seal the voids exposed at the cleaved end face, to provide a fiber end face having no voids to a depth of not more than 11 μm;
   wherein the stripped optical fiber has a cross-sectional diameter that does not change by more than 1% after the voids are collapsed; wherein the stripped optical fiber has a cross-sectional diameter change after the voids are collapsed is between 0.08% and 1%.

2. The method according to claim 1, including polishing the fiber end face to be in a common plane with the ferrule end face.

3. The method according to claim 1, wherein the optical fiber has an air-fill percent less than 1% and greater than 0.02%.

4. The method according to claim 1, wherein the optical fiber has an air-fill percent less than 0.7% and greater than 0.02%.

5. The method according to claim 1, wherein the optical fiber has an air-fill percent less than 0.2% and greater than 0.02%.

6. The method according to claim 1, wherein the optical fiber has an average airline size less than 0.3 microns and greater than 0.005 microns in cross-sectional diameter.

7. The method according to claim 1, wherein the energy is supplied directly to the cleaved end-face of the fiber by a laser.

8. The method of claim 1, wherein said energy is supplied by the output beam of a $CO_2$ laser and the optical axis of the output beam intercepts the fiber end face.

9. The method of claim 1, wherein said energy is supplied by the output beam of a $CO_2$ laser and said holes to be sealed to a depth of no more than 5 μm and no more than 20 $J/cm^2$ of energy is delivered to the end face of the fiber.

10. The method of claim 1, said fiber having an indentation in the fiber section end face, said indentation being less than 0.5 μm deep.

* * * * *